United States Patent [19]

Burgard

[11] Patent Number: 4,637,622
[45] Date of Patent: Jan. 20, 1987

[54] CHILD SAFETY STRAP

[76] Inventor: Francis A. Burgard, 12800 W. Cleveland Ave., New Berlin, Wis. 53151

[21] Appl. No.: 667,620
[22] Filed: Nov. 2, 1984
[51] Int. Cl.⁴ .............................................. A47D 1/10
[52] U.S. Cl. ............................... 280/33.99 B; 297/485
[58] Field of Search ..................... 280/801, 33.99 B; 297/464, 468, 485; 24/685 B

[56] References Cited

U.S. PATENT DOCUMENTS

| | | | |
|---|---|---|---|
| 944,020 | 12/1909 | De Camp | 297/485 |
| 1,991,633 | 2/1935 | Serpico | 297/485 |
| 2,383,918 | 8/1945 | Muller | 297/468 |
| 3,350,136 | 10/1967 | Allen | 280/33.99 B |
| 3,728,764 | 4/1973 | Carter | 297/468 |
| 4,204,695 | 5/1980 | Salzman | 280/33.99 B |

FOREIGN PATENT DOCUMENTS 647600  8/1962  Canada .................................. 297/468

Primary Examiner—John J. Love
Assistant Examiner—Ross Weaver
Attorney, Agent, or Firm—Bayard H. Michael

[57] ABSTRACT

One version of the safety strap is permanently connected to the wire frame adjacent the child seat in a shopping cart. The other version weaves the belt through the wire. Both belts restrain a child from standing and then falling out of the cart. The free end of either strap has a D ring sewn into the end. This prevents disassembly with consequent change of improper reassembly.

4 Claims, 4 Drawing Figures

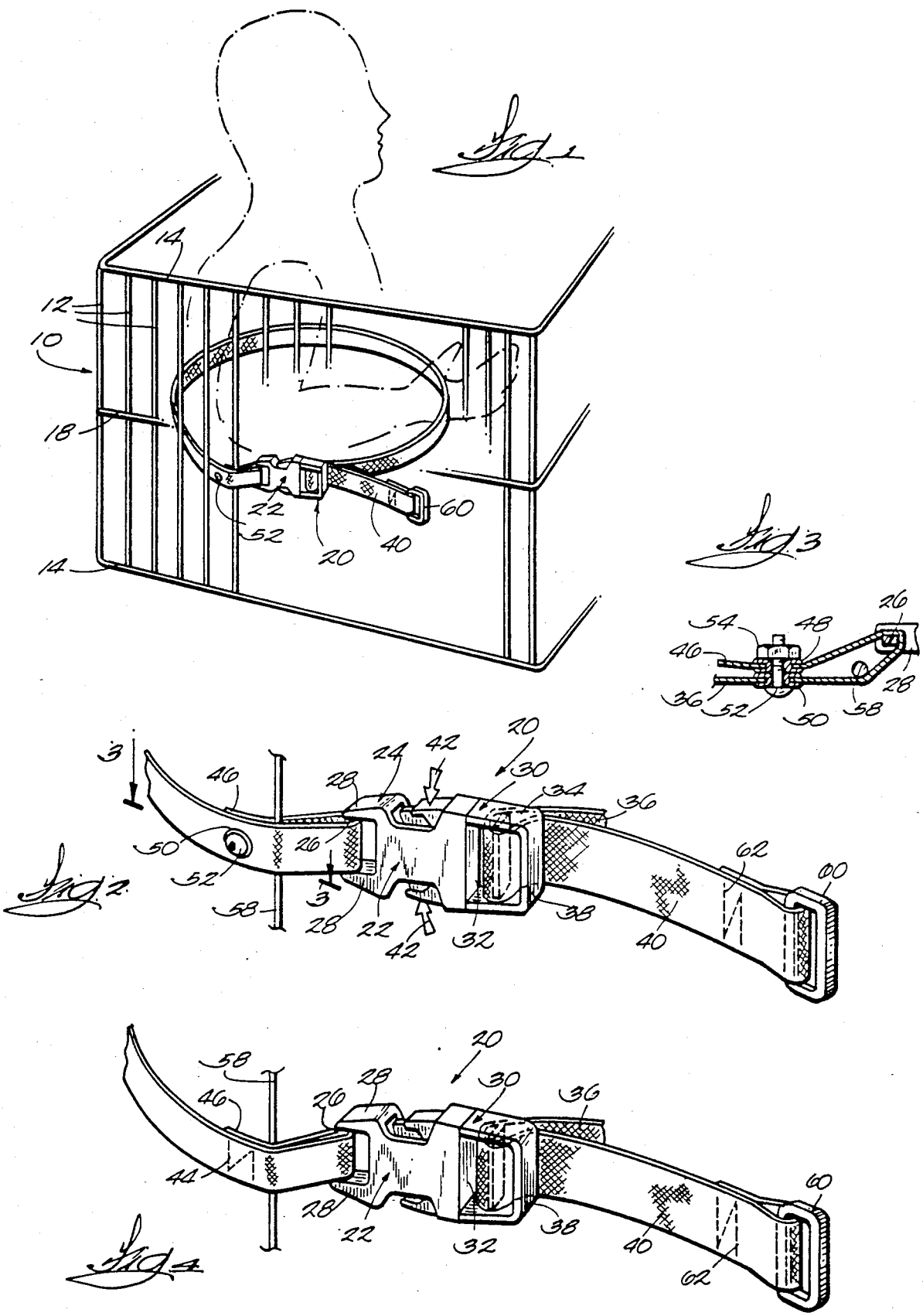

CHILD SAFETY STRAP

BACKGROUND OF THE INVENTION

Many supermarkets provide shopping carts which include a seat for young children. Children can and do stand up on the seat. They can fall with consequent injury. This frequently results in ligitation.

SUMMARY OF THE INVENTION

This invention relates to a safety strap to prevent a child from standing in a shopping cart or the like. This avoids injury and litigation.

The strap is effective; so people tend to steal the strap. Another aspect of the invention is to provide for permanent mounting of the strap on the cart while providing another version for purchase by the individual.

Both straps are adjustable in length. Normally, if care is not exercised, the strap can be removed from the serpentine adjusting arrangement and can then be reassembled improperly so it doesn't lock properly. This will allow the child to stand, fall and we have litigation against the supermarket and/or product liability litigation against the strap manufacturer. Another feature of this invention is to assemble both straps so as to prevent removal of the adjustable strap end from the buckle, thus precluding improper reassembly.

BRIEF DESCRIPTION OF THE DRAWINGS

FIG. 1 is a partial perspective view showing the manner in which the safety strap is used in conjunction with the child seat on a shopping cart.

FIG. 2 is an enlarged detail of FIG. 1.

FIG. 3 is a horizontal section taken on line 3—3 in FIG. 2.

FIG. 4 is an enlarged detail similar to FIG. 2 but showing a removable safety strap arrangement as opposed to the permanently mounted strap arrangement in FIG. 2.

DETAILED DESCRIPTION OF THE DRAWINGS

As depicted in FIG. 1, the child seat portion 10 of a shopping cart includes side walls made up of a multiplicity of vertical, parallel wire frame members 12 connected at the top and bottom by horizontal wire members 14, 16 and, in some instances, also interconnected at the mid-portion by another horizontal wire 18. The important aspect is that something wrapped around the wires cannot slide off the wires endwise since the spaces between the parallel wires are closed at the ends by the horizontal wires 14, 16, 18.

In the preferred embodiment for permanent use on a shopping cart, the safety strap arrangement 20 is provided with a buckle 22 having a female end 24 which includes a post 26 spanning the gap between the parallel fingers 28, 28. The male end 30 of the buckle 22 has the typical opening 32 divided by a post 34 around which the strap 36 is wound, with the free or unstressed end of the strap 36 exiting the space between the post 34 and the closed end 38 of the buckle. The end exits that space rearwardly or towards the person enclosed in the strap. The strap winds around the front of the post 34 and goes back between the main part of the buckle body and the post to then exit rearwardly and to the right as seen in the drawing. This causes the buckle teeth on the front of the divider 34 to engage the strap and hold it in place. If the free end 40 of the strap is pulled, the strap can feed around the post and in effect tighten on the child inside the loop. The reverse action pulling on the main strap 36 simply increases the "bite" on the strap. The buckle is released (disconnected) simply by pressing in the direction of the two opposed arrows 42.

The left side of the buckle is permanently connected to the strap by passing the strap around the post 26 and then connecting that end of the strap to the main body of the strap as may be seen clearly in FIGS. 2 and 4 and detail in FIG. 3. The difference between FIGS. 2 and 4 lies in the fact that in FIG. 4 the strap ends are sewn together by stitching 44 while in the FIGS. 2 and 3 version the end 46 of the strap 36 is provided with a grommet 48 which is brought into alignment with the grommet 50 provided in the strap near the end. When the two grommets are lined up, the bolt 52 is passed through the opening in the center of the two grommets and the lock nut 54 is then turned on to the bolt. But, before this is done, a wire frame member 58 is included inside the loop of the strap as can be seen clearly in FIGS. 2 and 3. Now the strap is captured on the cart adjacent the child seat. It cannot be removed readily. Preferably the bolt is provided with a one-way screw head or it could be an Allen wrench type of arrangement or any other suitable connection for which the user of the shopping cart is not likely to have tools to effect removal. While the connection is referred to as permanent, it will be understood this is not literally true. The user of the shopping cart will find that the strap cannot be stolen readily.

There is danger with a strap of this general type that the user will pull on the main strap where it exits the right-hand side of the buckle and pull the free end 40 of the strap towards and out of the buckle. When the user undertakes to reassemble the end, it seems to be about 50/50 as to whether or not the reassembly will be correct. If it is wrong the buckle will not prevent slipping and the child can get out. This is true in connection with either of the straps. Thus, if you can pull the strap out of the buckle, it can be reassembled wrong and constitutes a dangerous item since the user then has a false sense of security. Therefore, the free end in either the FIG. 2 or FIG. 4 version has a D-ring 60 sewn into the end loop by stitching 62. The D-ring is too big to pass through the buckle and therefore the user cannot pull the strap out too far and disassemble the serpentine connection. Therefore, the risk of improper assembly has been eliminated.

In practice, the supermarket will equip carts with safety straps to obtain a substantial reduction in insurance costs. The user finds that the safety strap cannot be stolen readily. At the check-out counter the user sees a display of the FIG. 4 version for sale and purchases the strap for use in stores not providing a safety strap. The profits on the sale of the individual user-owned version of FIG. 4 pays for equipping shopping carts. Everyone ends up happy and injuries are hopefully reduced to nil.

I claim:

1. A safety strap for children, comprising
    a safety buckle having a closed loop at one side and at its other side a serpentine connector permitting adjustment of a stap connected thereto,
    a strap having one end through said loop and connected back on itself to fix said one end to said one side of said buckle,
    the other end of said strap being led into and through said serpentine connector to adjustably connect said strap to said other side of said buckle with said other end of the strap extending out of the serpentine connector, and means fixed on said other end preventing pulling said other end back through and out of said serpentine connector, said means having no connection to said strap between said connector and said loop.

2. The combination of the safety strap of claim 1 with a vehicle of the type having a seat therein,
 a frame adjacent said seat,
 said strap engaging said frame,
 means blocking endwise removal of said strap from said frame so a child enclosed in the strap is restrained.

3. The combination of the safety strap according to claim 2 in which the strap is passed around said frame.

4. The combination of the safety strap according to claim 2 in which said one end of said strap embraces said loop and said vehicle frame and is connected back on itself by means of a connector which cannot be readily disconnected.

* * * * *